US012451053B2

(12) United States Patent
Yin et al.

(10) Patent No.: US 12,451,053 B2
(45) Date of Patent: Oct. 21, 2025

(54) METHOD FOR COMPENSATING DISPLAY PANEL AND APPARATUS FOR COMPENSATING DISPLAY PANEL, COMPUTER DEVICE, AND COMPUTER-READABLE STORAGE MEDIUM

(71) Applicants: Hefei BOE Joint Technology Co., Ltd., Anhui (CN); BOE Technology Group Co., Ltd., Beijing (CN)

(72) Inventors: Pengfei Yin, Beijing (CN); Min He, Beijing (CN); Miao Liu, Beijing (CN); Cheng Xu, Beijing (CN)

(73) Assignees: HEFEI BOE JOINT TECHNOLOGY CO., LTD., Anhui (CN); BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 18/566,669

(22) PCT Filed: Jan. 5, 2023

(86) PCT No.: PCT/CN2023/070656
§ 371 (c)(1),
(2) Date: Dec. 4, 2023

(87) PCT Pub. No.: WO2024/145867
PCT Pub. Date: Jul. 11, 2024

(65) Prior Publication Data
US 2025/0095545 A1 Mar. 20, 2025

(51) Int. Cl.
*G09G 3/32* (2016.01)
*G09G 3/3258* (2016.01)

(52) U.S. Cl.
CPC ............. *G09G 3/32* (2013.01); *G09G 3/3258* (2013.01); *G09G 2310/08* (2013.01); *G09G 2320/0233* (2013.01)

(58) Field of Classification Search
CPC .................................................. G09G 2330/10
See application file for complete search history.

(56) References Cited

U.S. PATENT DOCUMENTS

2019/0130837 A1 5/2019 Chen
2019/0189038 A1 6/2019 Park
(Continued)

FOREIGN PATENT DOCUMENTS

CN 105976753 A 9/2016
CN 107633810 A 1/2018
(Continued)

*Primary Examiner* — Robin J Mishler
(74) *Attorney, Agent, or Firm* — XSENSUS LLP

(57) ABSTRACT

A method for compensating a display panel includes: acquiring a first detection data set, the first detection data set including first detection data of the plurality of sub-pixel units; acquiring pre-stored position information of abnormal sub-pixel units, the position information being used to indicate positions of sub-pixel units whose display are abnormal; replacing first detection data of a first abnormal sub-pixel unit in the first detection data set based on first detection data of a target sub-pixel unit, so as to acquire a second detection data set, the target sub-pixel unit being at least one normal sub-pixel unit adjacent to the first abnormal sub-pixel unit among the plurality of sub-pixel units, and the first abnormal sub-pixel unit being any of the sub-pixel units indicated by the position information; and compensating data voltages of the plurality of sub-pixel units according to the second detection data set.

18 Claims, 6 Drawing Sheets

(56) References Cited

U.S. PATENT DOCUMENTS

| | | | | |
|---|---|---|---|---|
| 2021/0074224 | A1 | 3/2021 | Wei et al. | |
| 2023/0419911 | A1 | 12/2023 | Huang et al. | |
| 2024/0029601 | A1 * | 1/2024 | He ......................... | G09G 3/006 |

FOREIGN PATENT DOCUMENTS

| | | | |
|---|---|---|---|
| CN | 108806609 | A | 11/2018 |
| CN | 109887461 | A | 6/2019 |
| CN | 111524197 | A | 8/2020 |
| CN | 114038428 | A | 2/2022 |
| CN | 115019735 | A | 9/2022 |
| KR | 2017-0062575 | A | 6/2017 |

* cited by examiner

METHOD FOR COMPENSATING DISPLAY PANEL AND APPARATUS FOR COMPENSATING DISPLAY PANEL, COMPUTER DEVICE, AND COMPUTER-READABLE STORAGE MEDIUM

CROSS-REFERENCE TO RELATED APPLICATION

This application is a US national stage of international application No. PCT/CN2023/070656, filed on Jan. 5, 2023, the disclosure of which is incorporated herein by reference in its entirety.

TECHNICAL FIELD

Embodiments of the present disclosure relate to the field of display technologies, and more particularly, to a method for compensating a display panel and apparatus for compensating a display panel, a computer device, and a computer-readable storage medium.

BACKGROUND OF THE INVENTION

Displaying apparatuses, which are used to display image information, can be seen everywhere in daily life, such as mobile phones, computers, and televisions. A display panel is a key component of the displaying apparatus. The display panel typically includes a plurality of sub-pixel units, each sub-pixel unit includes a pixel drive circuit and a light-emitting element which are connected with each other. The pixel drive circuit is used to drive the connected light-emitting element to emit light, so as to display a corresponding image.

In related technologies, the pixel drive circuit may be compensated by an external compensation technology to improve the display uniformity of the display panel. In the external compensation technology, a detection circuit is connected to a drive transistor in the pixel drive circuit. Detection data, such as a drain voltage of the drive transistor, is detected by the detection circuit, an electrical compensation parameter is calculated by using the detected detection data, and finally the pixel drive circuit is compensated by the electrical compensation parameter.

In some cases, some sub-pixel units still have abnormal luminance after being compensated by the external compensation technology.

SUMMARY OF THE INVENTION

The present disclosure provides a method and apparatus for displaying a display panel, a device and a storage medium, which are conducive to improving a displaying effect of the display panel. The technical solutions are summarized as follows.

In an aspect, an embodiment of the present disclosure provides a method for compensating a display panel. The display panel includes a plurality of pixel units arranged in an array, and each pixel unit includes a plurality of sub-pixel units. The method includes: acquiring a first detection data set, where the first detection data set includes first detection data of the plurality of sub-pixel units; acquiring pre-stored position information of abnormal sub-pixel units, where the position information is used to indicate positions of sub-pixel units whose display are abnormal; replacing the first detection data of the first abnormal sub-pixel unit in the first detection data set according to the first detection data of a target sub-pixel unit, so as to obtain a second detection data set, where the target sub-pixel unit is at least one normal sub-pixel unit adjacent to the first abnormal sub-pixel unit among the plurality of sub-pixel units, and the first abnormal sub-pixel unit is any of the sub-pixel units indicated by the position information; and compensating data voltages of the plurality of sub-pixel units according to the second detection data set.

Optionally, the replacing the first detection data of the first abnormal sub-pixel unit in the first detection data set based on the first detection data of the target sub-pixel unit includes:

replacing the first detection data of the first abnormal sub-pixel unit with the first detection data of one normal sub-pixel unit which is disposed in the same row as the first abnormal sub-pixel unit and adjacent to the first abnormal sub-pixel unit; or replacing the first detection data of the first abnormal sub-pixel unit with an average value of the first detection data of at least two normal sub-pixel units which are disposed in the same row as the first abnormal sub-pixel unit and adjacent to the first abnormal sub-pixel unit.

Optionally, the method further includes:

prior to replacing the first detection data of the first abnormal sub-pixel unit in the first detection data set based on the first detection data of the target sub-pixel unit, filtering the first detection data in the first detection data set.

Optionally, the method further includes:

acquiring a third detection data set, where the third detection data set includes second detection voltages of the plurality of sub-pixel units;

compensating the respective sub-pixel units according to the third detection data set, when the display panel displays a first image;

acquiring a display-related parameter set when the display panel displays the first image, where the display-related parameter set includes display-related parameters of the plurality of sub-pixel units;

determining the position information of the abnormal sub-pixel units according to the display-related parameter set; and storing the position information in a storage unit of a displaying apparatus.

In an exemplary embodiment, the display-related parameters include at least one of the following parameters: luminance of each sub-pixel unit, a threshold voltage of a drive transistor in each sub-pixel unit, and mobility of the drive transistor in each sub-pixel unit.

In some examples, the determining the position information of the abnormal sub-pixel units according to the display-related parameter set includes:

determining position information of a sub-pixel unit corresponding to the display-related parameter that reaches a first threshold as the position information of the abnormal sub-pixel unit.

In other examples, the determining the position information of the abnormal sub-pixel units according to the display-related parameter set includes:

performing frequency domain conversion on the display-related parameters to obtain frequency domain parameters; and determining position information of a sub-pixel unit corresponding to the display-related parameter that reaches a second threshold as the position information of the abnormal sub-pixel unit.

Optionally, the compensating the pixel drive circuits of the corresponding sub-pixel units according to the second detection data set includes:

calculating an electrical compensation parameter set according to the second detection data set, where the electrical compensation parameter set includes electrical compensation parameters of the plurality of sub-pixel units; and performing electrical compensation on data voltages of pixel drive circuits of corresponding sub-pixel units according to the electrical compensation parameter set.

Optionally, the compensating the pixel drive circuits of the corresponding sub-pixel units according to the second detection data set further includes:

prior to compensating the data voltages of the pixel drive circuits of the corresponding sub-pixel units by using the electrical compensation parameter set, performing optical compensation on the data voltages of the pixel drive circuits of the corresponding sub-pixel units according to pre-stored optical compensation parameters.

In another aspect, an embodiment of the present disclosure provides an apparatus for compensating a display panel. The display panel includes a plurality of pixel units arranged in an array, and each pixel unit includes a plurality of sub-pixel units. The apparatus includes a detection data acquiring module, a position information acquiring module, a replacing module and a compensating module. The detection data acquiring module is configured to acquire a first detection data set, and the first detection data set includes first detection data of the plurality of sub-pixel units; the position information acquiring module is configured to acquire pre-stored position information of abnormal sub-pixel units, and the position information is used to indicate positions of sub-pixel units whose display are abnormal; the replacing module is configured to replace the first detection data of the first abnormal sub-pixel unit in the first detection data set according to the first detection data of a target sub-pixel unit, so as to obtain a second detection data set, the target sub-pixel unit is at least one normal sub-pixel unit adjacent to the first abnormal sub-pixel unit among the plurality of sub-pixel units, the first abnormal sub-pixel unit is any of the sub-pixel units indicated by the position information; and the compensating module is configured to compensate the plurality of sub-pixel units according to the second detection data set.

Optionally, the replacing module is configured to replace the first detection data of the first abnormal sub-pixel unit in any of the following ways:

replace the first detection data of the first abnormal sub-pixel unit with the first detection data of one normal sub-pixel unit which is disposed in the same row as the first abnormal sub-pixel unit and adjacent to the first abnormal sub-pixel unit; and replace the first detection data of the first abnormal sub-pixel unit with an average value of the first detection data of at least two normal sub-pixel units which are disposed in the same row as the first abnormal sub-pixel unit and adjacent to the first abnormal sub-pixel unit.

Optionally, the apparatus further includes a filtering module, and the filtering module is configured to filter the first detection data in the first detection data set.

Optionally, the compensating module includes an electrical compensation parameter calculating sub-module configured to calculate an electrical compensation parameter set according to the second detection data set, where the electrical compensation parameter set includes electrical compensation parameters of the plurality of sub-pixel units; and an electrical compensation sub-module configured to perform electrical compensation on the data voltages of the pixel drive circuits of the corresponding sub-pixel units according to the electrical compensation parameter set.

Optionally, the compensating module further includes an optical compensation sub-module configured to perform optical compensation on the data voltages of the pixel drive circuits of the corresponding sub-pixel units according to pre-stored optical compensation parameters.

In yet another aspect, an embodiment of the present disclosure provides a computer device, the computer device includes a memory and a processor, at least one computer program is stored in the memory, and the at least one computer program is loaded and executed by the processor to implement any of the aforementioned methods for compensating the display panel.

In yet another aspect, an embodiment of the present disclosure provides a computer-readable storage medium, the computer-readable storage medium is configured to store at least one computer program therein, and the at least one computer program is loaded and executed by a processor to implement any of the aforementioned methods for compensating the display panel.

In another aspect, an embodiment of the present disclosure provides a displaying apparatus, and the displaying apparatus includes a display panel, a time controller and a source controller. The source controller is electrically connected to the time controller and the display panel, respectively. The time controller is configured to perform any of the aforementioned compensation methods to compensate the data voltages of the plurality of sub-pixel units; and the source controller is configured to control the corresponding sub-pixel units to emit light according to the compensated data voltages.

The technical solutions provided by the embodiments of the present disclosure at least have the following beneficial effects.

In the embodiments of the present disclosure, the first detection data of the abnormal sub-pixel units is replaced according to the pre-stored position information of the abnormal sub-pixel units and the first detection data of at least one normal sub-pixel unit adjacent to the abnormal sub-pixel units; and the abnormal sub-pixel units are compensated according to the replaced data, so that the luminance of each compensated abnormal sub-pixel unit is closer to that of the adjacent normal sub-pixel unit, thereby improving the uniformity of the display luminance of the displaying apparatus.

BRIEF DESCRIPTION OF DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

The technical or scientific terms as used in the present disclosure should have the meanings as commonly understood by a person of ordinary skill in the art of the present disclosure, unless otherwise defined. The words "first", "second", "third" and similar terms used in the description and claims of the present disclosure do not denote any order, quantity, or importance, and are merely used to distinguish different components. Similarly, words such as "a" or "one" do not denote a quantitative limit, but rather the existence of at least one. The word "include", "comprise" or similar terms mean that elements or objects appearing before the term "include" or "comprise" cover the listed elements or objects and its equivalents appearing after the term "include" or "comprise", while other elements or objects are not excluded. The word "connected to" or "connected with" and similar terms are not limited to physical or mechanical connections, and may include electrical connection and the connection may be direct or indirect. "Upper", "lower", "left", "right" and the like are only used to indicate the relative positional relationship, and when the absolute position of a described object changes, the relative positional relationship may also change accordingly.

In order to make the objectives, technical schemes and advantages of the present disclosure clearer, a further detailed description will be made to the embodiments of the present disclosure below with reference to the accompanying drawings.

A display region of a display panel includes a plurality of pixel units arranged in an array, and each pixel unit includes a plurality of sub-pixel units. The plurality of sub-pixel units are used to emit light of different colors. For example, each pixel unit includes three sub-pixel units, which are used to emit red (R) light, blue (B) light, and green (G) light, respectively. As another example, each pixel unit includes four sub-pixel units, which are used to emit red light, blue light, green light, and white (W) light, respectively. Each sub-pixel unit includes a pixel drive circuit and a light-emitting element which are connected with each other, and the pixel drive circuit is used to drive the connected light-emitting element to emit light. By controlling the color and luminance of light emitted from each pixel unit, the display panel may display a corresponding screen.

The above light-emitting elements include a variety of structures, which may be selected according to actual needs. For example, each of the above light-emitting elements may be an organic light-emitting diode (OLED), a quantum dot light-emitting diode (QLED) or a micro light emitting diode (Micro LED).

Figure 1:
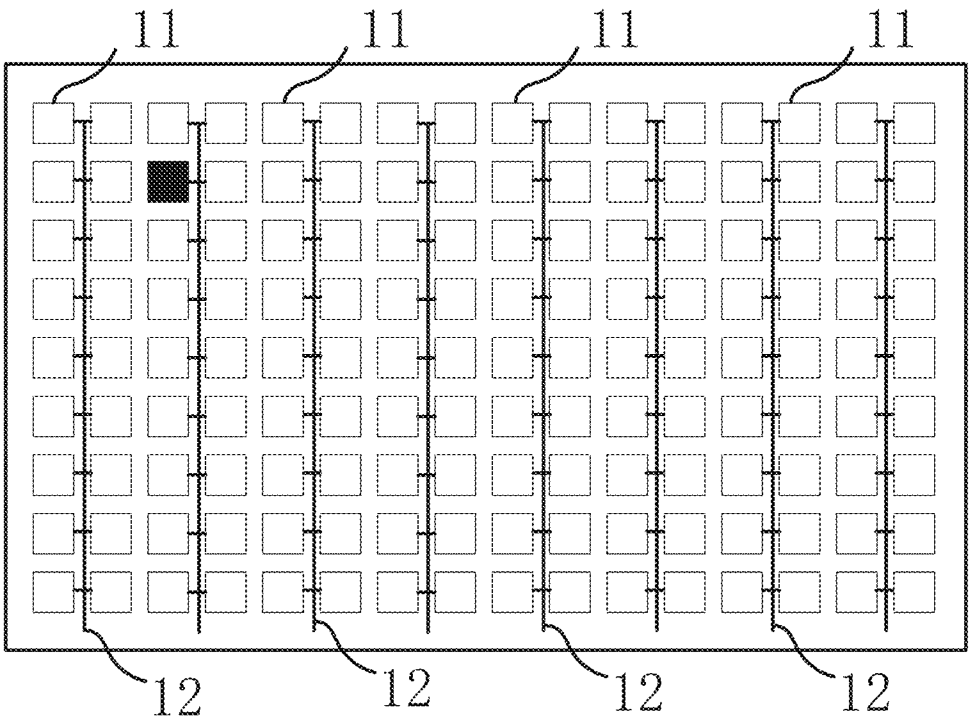
FIG. 1 is a schematic diagram of a connection mode of sub-pixel units and sensing lines in a display panel.

FIG. 1 is a schematic diagram of a connection mode of sub-pixel units and sensing lines in a display panel. As shown in FIG. 1, in the display panel, every two adjacent columns of sub-pixel units 11 are connected to one sensing line 12. The number of sub-pixel units 11 and the number of the sensing lines 12 in FIG. 1 are exemplary, which does not constitute any limitation on the display panel in the embodiments of the present disclosure.

Figure 2:
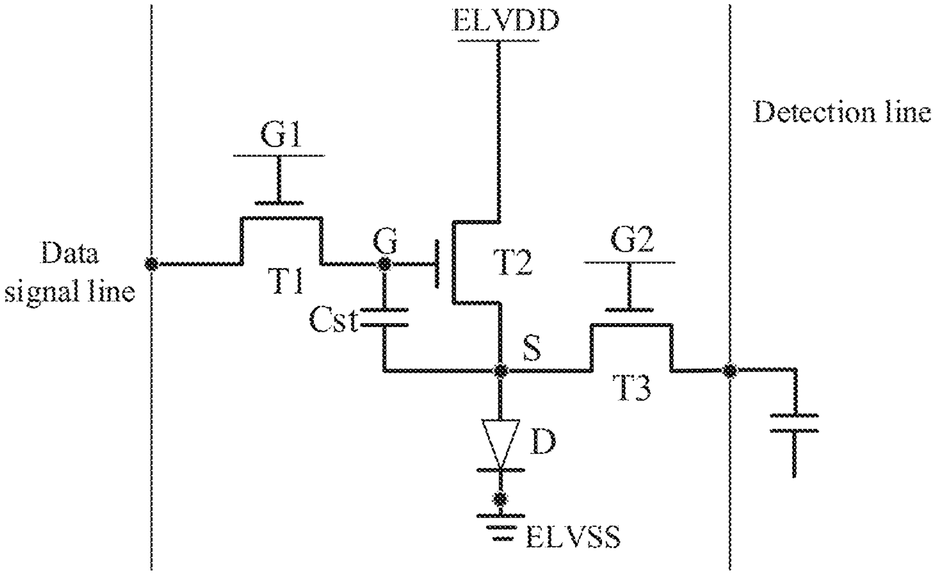
FIG. 2 is a schematic structural diagram of a pixel drive circuit of a sub-pixel unit.

FIG. 2 is a schematic structural diagram of a pixel drive circuit of a sub-pixel unit. As shown in FIG. 2, the pixel drive circuit includes a switch thin film transistor (TFT) T1, a drive TFT T2, a capacitor Cst, and a light-emitting element D. A gate of the switch TFT T1 is connected to a first scan signal line G1, a source of the switch TFT T1 is connected to a data signal line, and a drain of the switch TFT T1 is connected to a gate of the drive TFT T2. A source of the drive TFT T2 is connected to a first power line ELVDD, and a drain of the drive TFT T2 is connected to an anode of the light-emitting element D. A cathode of the light-emitting element D is connected to a second power line ELVSS. One terminal of the capacitor Cst is connected to the drain of the switch TFT T1 and the gate of the drive TFT T2, respectively; and the other terminal of the capacitor Cst is connected to the drain of the drive TFT T2 and the anode of the light-emitting element D, respectively.

A working time sequence of this pixel drive circuit includes a data writing phase and a light-emitting driving phase. In the data writing phase, the first scan signal line G1 controls the switch TFT T1 to be turned on, and a data voltage of the data signal line is written to the gate of the drive TFT T2. In the light-emitting driving phase, the first scan signal line G1 controls the switch TFT T1 to be turned off. Due to a storage effect of the capacitor Cst, the drive TFT T2 is turned on, and the light-emitting element D emits light.

It should be noted that FIG. 1 is described by taking a 2T1C (i.e., two TFTs and one capacitor) circuit as an example. In other embodiments, the number and connection relationship of TFTs and capacitors in the pixel drive circuit may also be adjusted according to actual needs, as long as the pixel drive circuit can drive the light-emitting element to emit light.

Since a threshold voltage of the drive TFT T2 changes during the use of the displaying apparatus, the pixel drive circuit may be compensated by an external compensation technology in related technologies, in order to prevent this change from affecting the displaying effect of the displaying apparatus.

To achieve external compensation, the pixel drive circuit in FIG. 2 further includes a detection TFT T3, where a gate of the detection TFT T3 is connected to a second scan signal line G2, a source of the detection TFT T3 is connected to a node S (that is, the drain of the drive TFT T2), and a drain of the detection TFT T3 is connected to a detection line. Typically, a plurality of pixel units in the same column are connected to the same detection line.

However, when short-circuiting occurs between the pixel drive circuit and the detection line, detection data detected by the detection line will be abnormally large or small, and an electrical compensation parameter calculated according to this detection data will also be abnormally large or small, resulting in the abnormality of this sub-pixel unit point. Since the pixel drive circuits of pixel units in one column share one detection line, the abnormality in the detection data of one sub-pixel unit will lead to the abnormality in the detection data of all sub-pixel units connected by this detection line, so the electrical compensation parameters of all sub-pixel units connected by this detection line, which are calculated according to the detection data, are also abnormal. For example, as shown in FIG. 1, a black square indicates an abnormal sub-pixel unit. In a case that the sub-pixel unit is abnormal, the corresponding electrical compensation parameters of the sub-pixel units in the third and fourth columns may be abnormal.

The electrical compensation parameter being a threshold compensation voltage is taken as an example. The process of external compensation is to enter a threshold voltage detection phase prior to the data writing phase. In the threshold voltage detection phase, the first scan signal line G1 controls the switch TFT T1 to be turned on, the data signal line writes a reference voltage to the gate of the drive TFT T2, the detection line detects a drain voltage of the drive TFT T2, and a detection circuit acquires a threshold voltage of the drive TFT T2 according to the reference voltage and the drain voltage of the drive TFT T2. During the data write phase, this threshold voltage and the data voltage are superposed and then written to the gate of the drive TFT T2. That is, the threshold compensation voltage is equal to the threshold voltage calculated from the drain voltage of the drive TFT T2.

After external compensation, an abnormal threshold compensation voltage will be manifested as an abnormal display line in a screen displayed by the display panel. Here, the abnormal display line may also be called an abnormal luminance line, which refers to a column of pixel units with abnormal luminance when the display panel is turned on. Here, the abnormal luminance refers to the luminance being higher or lower than that of other regions. For example, when short-circuiting occurs between the detection line and a first power line, the detection voltage detected by the detection line is too large, and the threshold compensation voltage calculated according to the detection voltage is too small, so the luminance of the abnormal display line is lower than the luminance of other regions, which may be called a dark line. When short-circuiting occurs between the detection line and a second power line, the detection voltage detected by the detection line is too small, and the threshold compensation voltage calculated according to the detection voltage is too large, so the luminance of the abnormal display line is higher than the luminance of other regions, which may be called a bright line.

In related technologies, the maximum and minimum values among a plurality of consecutive detection data may be removed by filtering the detection data, so that the plurality of detection data changes gently. However, if a plurality of consecutive detection data is abnormal, the plurality of consecutive abnormal detection data cannot be filtered out by means of filtering. Therefore, the abnormal sub-pixel cells corresponding to these detection data cannot be compensated, resulting in the existence of display abnormality.

For this purpose, an embodiment of the present disclosure provides a method for compensating a display panel, in order to improve the display uniformity of the display panel.

Figure 3:
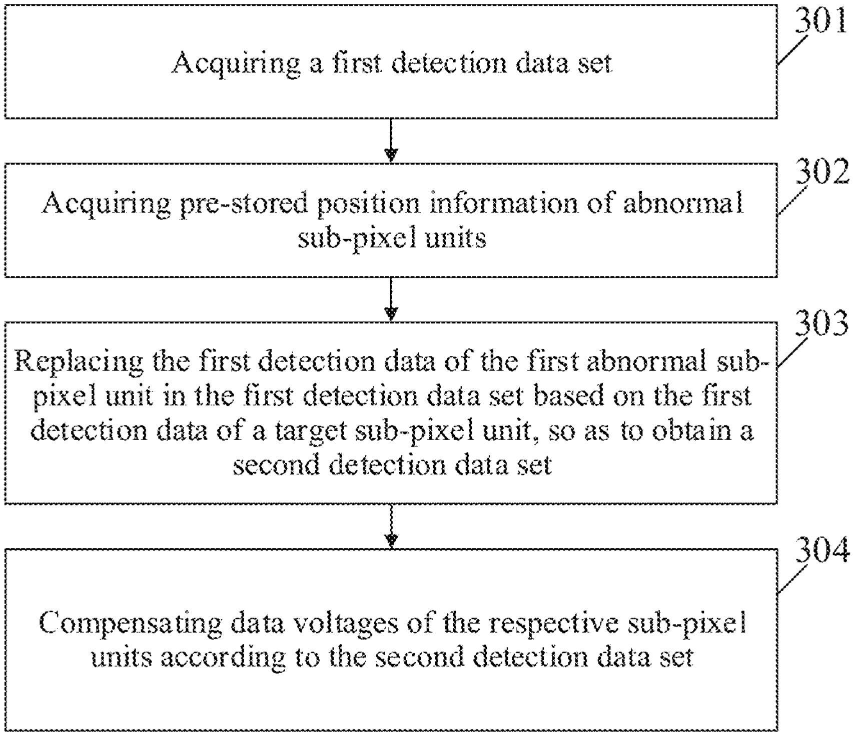
FIG. 3 is a flowchart of a method for compensating a display panel provided by an embodiment of the present disclosure.

FIG. 3 is a flowchart of a method for compensating a display panel provided by an embodiment of the present disclosure. Referring to FIG. 3, the method is performed by a control unit, e.g., a time controller (TCON), of a displaying apparatus. The method includes the following steps.

In Step 301, a first detection data set is acquired.

The first detection data set includes first detection data of a plurality of sub-pixel units. Here, the plurality of sub-pixel units are all sub-pixel units in a display region of the display panel. The first detection data includes at least one of a first detection voltage and a first detection current. The first detection voltage is a detection voltage detected by a detection line connected to each sub-pixel unit, i.e., a voltage of the aforementioned node S. The first detection current is a detection current detected by the detection line connected to each sub-pixel unit.

Hereinafter, the description is made by taking the first detection data including the first detection voltage as an example.

In step 302, pre-stored position information of abnormal sub-pixel units is acquired.

In this embodiment of the preset disclosure, the position information is used to indicate positions of the sub-pixel units whose display are abnormal.

Here, the display abnormality means that when the display panel displays a screen of the same color, the luminance of sub-pixel units is abnormal. In a case that the display panel displays the screen of the same color, ideally all sub-pixel units should have the same luminance. Therefore, the sub-pixel units that have the luminance higher or lower than that of other sub-pixel units may be considered as abnormal sub-pixel units.

In an exemplary embodiment, the position information of the abnormal sub-pixel units may take the form of coordinates. For example, the position information of an abnormal sub-pixel unit is A(x,y), where A represents the color of the sub-pixel unit, such as R, G, or B, x represents row coordinates of a pixel unit to which the abnormal sub-pixel unit belongs (for example which pixel unit is disposed in a row direction), and y represents column coordinates of the pixel unit to which the abnormal sub-pixel unit belongs (for example which pixel unit is disposed in a column direction).

In this embodiment of the present disclosure, the sub-pixel units corresponding to the position information may be a column of sub-pixel units or a plurality of columns of sub-pixel units; or the sub-pixel units corresponding to the position information may be a single sub-pixel unit, or a plurality of scattered sub-pixel units.

In this embodiment of the present disclosure, the row direction refers to an extension direction of a scan line, and the column direction refers to an extension direction of a data line and a detection line. In some examples, the row direction is a horizontal direction, and the column direction is a vertical direction. In other examples, the row direction is a vertical direction, and the column direction is a horizontal direction.

In this embodiment of the present disclosure, the position information is stored in advance in a storage unit of the displaying apparatus. For example, the position information is stored in a memory of the TCON of the displaying apparatus.

In step 303, first detection data of the first abnormal sub-pixel unit in the first detection data set is replaced according to the first detection data of a target sub-pixel unit to obtain a second detection data set.

The target sub-pixel unit is at least one normal sub-pixel unit adjacent to the first abnormal sub-pixel unit among a plurality of sub-pixel units, the first abnormal sub-pixel unit is any of the sub-pixel units indicated by the position information, and the normal sub-pixel units are other sub-pixel units in all sub-pixel units expect the abnormal sub-pixel unit, that is, sub-pixel units other than the sub-pixel unit indicated by the position information. The second detection data set includes the first detection data of the normal sub-pixel units and second detection data of the abnormal sub-pixel units, which is replaced first detection data.

In step 304, data voltages of the respective sub-pixel units are compensated according to the second detection data set.

In step 304, the data voltages of the normal sub-pixel units are compensated according to the first detection data of the normal sub-pixel units, and the data voltages of the abnormal sub-pixel units are compensated according to the second detection data of the abnormal sub-pixel units.

In this embodiment of the present disclosure, the first detection data of the abnormal sub-pixel units is replaced according to the pre-stored position information of the abnormal sub-pixel units and the first detection data of at least one normal sub-pixel unit adjacent to the abnormal sub-pixel units; and the abnormal sub-pixel units are compensated according to the replaced data, so that the luminance of each compensated abnormal sub-pixel unit is closer to that of the adjacent normal sub-pixel unit, thereby improving the uniformity of the display luminance of the display panel.

Figure 4:
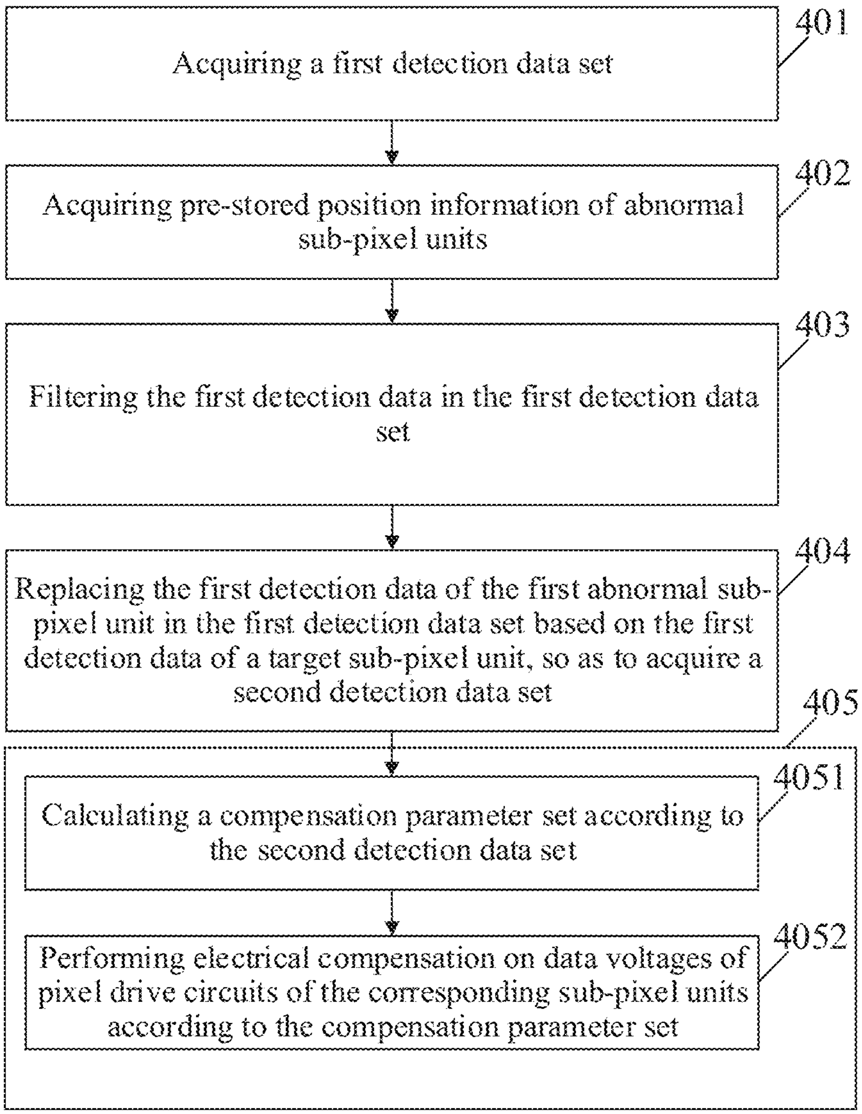
FIG. 4 is a flowchart of another method for compensating a display panel provided by an embodiment of the present disclosure.

FIG. 4 is a flowchart of another method for compensating a display panel provided by an embodiment of the present disclosure. Referring to FIG. 4, the method is performed by a control unit, e.g., a TCON, of a displaying apparatus. The method includes the following steps.

In Step 401, a first detection data set is acquired.

Here, please refer to the descriptions in step 301 for the relevant content of the first detection data set, which will not be described in detail.

In step 402, pre-stored position information is acquired.

Here, please refer to the descriptions in step 302 for the relevant content of the position information, which will not be described in detail.

In step 403, a plurality of first detection data in the first detection data set is filtered.

In some examples, the filtering of the plurality of first detection data in the first detection data set is performed and it includes the following two cases.

In the first case where a difference obtained by subtracting the $(i-1)^{th}$ detection data from the $i^{th}$ detection data is greater than a first threshold, and a difference obtained by subtracting the (i+1)th detection data from the $i^{th}$ detection data is greater than the first threshold, the $i^{th}$ detection data is replaced by target data, where the first threshold is a positive number. In the second case where a difference obtained by subtracting the $(i-1)^{th}$ detection data from the $i^{th}$ detection data is less than a second threshold, and a difference obtained by subtracting the $(i+1)^{th}$ detection data from the $i^{th}$ detection data is less than the second threshold, the $i^{th}$ detection data is replaced by target data. The second threshold is a negative number. An absolute value of the first threshold may be equal or unequal to an absolute value of the second threshold.

In other examples, in addition to the first and second cases above, the filtering of the plurality of first detection data in the first detection data set may be performed in other cases.

In a case that a difference obtained by subtracting the $(i-2)^{th}$ detection data from the $i^{th}$ detection data is greater than a third threshold, and a difference obtained by subtracting the $(i+2)^{th}$ detection data from the $i^{th}$ detection data is greater than the third threshold, the $i^{th}$ detection data is replaced by target data, where the third threshold is a positive number. Secondly, in a case that a difference obtained by subtracting the $(i-2)^{th}$ detection data from the $i^{th}$ detection data is less than a fourth threshold, and a difference obtained by subtracting the $(i+2)^{th}$ detection data from the $i^{th}$ detection data is less than the fourth threshold, the $i^{th}$ detection data is replaced by target data. The fourth threshold is a negative number. An absolute value of the third threshold may be equal or unequal to an absolute value of the fourth threshold. Optionally, the third threshold may be equal to the first threshold, and the fourth threshold may be equal to the second threshold.

Here, the target data is determined according to at least one detection data adjacent to the $i^{th}$ detection data. Optionally, the target data is the $(i-1)^{th}$ detection data, or the $(i+1)^{th}$ detection data, or an average value of the $(i-1)^{th}$ detection data and the $(i+1)^{th}$ detection data.

In this embodiment of the present disclosure, the first detection data may be filtered such that the detection data of some abnormal sub-pixel units is filtered out in advance, where part of these abnormal sub-pixel units may be generated after leaving a factory, and the position information of these abnormal sub-pixel units generated after leaving the factory is not stored in advance. During the filtering process, the first detection data of this part of the abnormal sub-pixel units may be processed, such that the corresponding sub-pixel units are compensated according to the filtered detection data, thereby achieving a better displaying effect.

In step 404, first detection data of the first abnormal sub-pixel unit in the first detection data set is replaced based on the first detection data of a target sub-pixel unit to obtain a second detection data set.

Here, please refer to the descriptions in step 303 for the relevant content of the target sub-pixel unit, the first abnormal sub-pixel unit and the second detection data set, which will not be described here in detail.

In this step 404, the first detection data of the target sub-pixel unit is the filtered first detection data.

The step 404 includes: replacing the first detection data of the first abnormal sub-pixel unit in the first detection data set in any of the following two ways.

In the first way, the first detection data of the first abnormal sub-pixel unit is replaced by the first detection data of one normal sub-pixel unit which is disposed in the same row as the first abnormal sub-pixel unit and adjacent to the first abnormal sub-pixel unit. For example, the first detection data of the first abnormal sub-pixel unit is replaced by the first detection data of a left normal sub-pixel unit which is disposed in the same row as the first abnormal sub-pixel unit and adjacent to the first abnormal sub-pixel unit, or of a right normal sub-pixel unit which is disposed in the same row as the first abnormal sub-pixel unit and adjacent to the first abnormal sub-pixel unit.

In the second way, the first detection data of the first abnormal sub-pixel unit is replaced by an average value of the first detection data of at least two normal sub-pixel units which are disposed in the same row as the first abnormal sub-pixel unit and adjacent to the first abnormal sub-pixel unit. For example, the first detection data of the first abnormal sub-pixel unit is replaced by an average value of the first detection data of a left normal sub-pixel unit and a right normal sub-pixel unit which are disposed in the same row as the first abnormal sub-pixel unit and adjacent to the first abnormal sub-pixel unit.

The above replacement ways are simple with small calculation amount.

In step 405, data voltages of the corresponding sub-pixel units are compensated according to the second detection data set.

In this embodiment of the present disclosure, the step 405 may include the following steps.

In step 4051, a compensation parameter set is calculated according to the second detection data set.

The compensation parameter set includes electrical compensation parameters of a plurality of sub-pixel units, and the electrical compensation parameters include at least one of a threshold compensation voltage and a mobility compensation parameter.

A calculation method for the threshold compensation voltage and a calculation method for the mobility compensation parameter may refer to any method in the related technologies, which will not be limited in the embodiments of the present disclosure.

In step 4052, electrical compensation is performed on the data voltages of pixel drive circuits of the corresponding sub-pixel units according to the compensation parameter set.

In some examples, in a case that the electrical compensation parameter is the threshold compensation voltage, the step 4052 includes: taking a sum of the threshold compensation voltage and the data voltage as a compensated data voltage.

In other examples, in a case that the electrical compensation parameter is a mobility compensation parameter, a product of the mobility compensation parameter and the data voltage may be used as a compensated data voltage.

In other examples, in a case that the electrical compensation parameters include the threshold compensation voltage and the mobility compensation parameter, a sum of a product of the mobile compensation parameter and the data voltage and the threshold compensation voltage may be used as a compensated data voltage.

In this embodiment of the present disclosure, the data voltages of the sub-pixel units are electrically compensated according to the replaced detection data, so that the display luminance of the display panel may be more uniform after compensation.

Optionally, the step 405 further includes:

prior to step 4052, performing optical compensation on the data voltages of pixel drive circuits of the corresponding sub-pixel units according to the pre-stored optical compensation parameters.

The optical compensation parameters are used to indicate a relationship between preset grayscales and the display luminance of the sub-pixel units. In an exemplary embodiment, the optical compensation parameters include a slope k and an intercept b.

In some examples, the following formula may be used to perform optical compensation on the data voltage.

$$y=kx+b,$$

where y represents a data voltage after compensation, x represents a data voltage before compensation, that is, x represents a data voltage converted from image data.

In an exemplary embodiment, the formula may be determined in the following way.

The display panel is controlled to display monochrome test images under a plurality of preset grayscales, where the plurality of preset grayscales forms a grayscale sequence, and the colors of the monochrome test images correspond to the colors of the sub-pixel units contained in the pixel units of the display panel. For example, the grayscale sequence is {32, 64, 96, 160, 196, 224}, and each grayscale corresponds to a three-color test image.

Each monochrome test image displayed by the display panel is captured to obtain a plurality of captured images, and each captured image corresponds to a monochrome test image with one grayscale.

The sub-pixel luminance of the sub-pixel of the corresponding color under the corresponding grayscale is determined according to each captured image.

Linear fitting is performed according to each sub-pixel luminance and grayscale sequence in the captured image of the first color, to obtain the slope k and intercept b corresponding to each sub-pixel unit.

Assuming that in a captured image corresponding to a red test screen with a grayscale sequence {32, 64, 96, 160, 196, 224}, taking a sub-pixel as an example, the sub-pixel luminance is 30, 60, 90, 162, 198, 226, a coordinate system array may be determined as {(32, 30), (64, 60), (96, 90), (160, 162), (196, 198), (224, 226)}. The above array may be subjected to linear fitting to obtain a fitted straight line. The slope of the fitted straight line is the aforementioned slope k, and the intercept of the fitted straight line is the aforementioned intercept b.

It should be noted that the method of determining the optical compensation parameters will not be limited in the embodiments of the present disclosure, while any method that can determine optical compensation parameters in the related technologies may be adopted.

In this embodiment of the present disclosure, by adding the optical compensation, the display panel may have a better displaying effect.

Optionally, in order to allow the TCON of the displaying apparatus to acquire the position information in the displaying process of the displaying apparatus after the displaying apparatus leaves the factory, it is necessary to firstly acquire the position information of the abnormal sub-pixel units and store the acquired position information in the storage unit of the displaying apparatus before the displaying apparatus leaves the factory.

Figure 5:
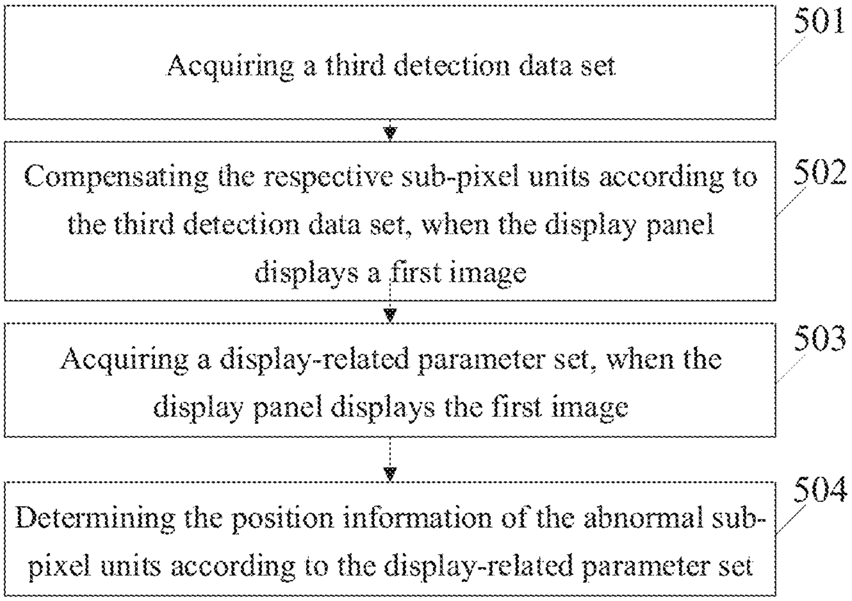
FIG. 5 is a schematic flowchart for acquiring position information provided by an embodiment of the present disclosure.

The process of determining the position information of the abnormal sub-pixel units is exemplarily described as follows. FIG. 5 is a flowchart of a process of acquiring the position information of abnormal sub-pixel units provided by an embodiment of the present disclosure. Referring to FIG. 5, the method is performed by a control unit, e.g., a TCON, of a displaying apparatus. The method includes the following steps.

In Step 501, a third detection data set is acquired.

The third detection data set includes second detection voltages of a plurality of sub-pixel units.

In step 502, the respective sub-pixel units are compensated according to the third detection data set, when the display panel displays a first image.

The first image is a monochrome image under a preset grayscale, and the color of the monochrome image corresponds to the color of sub-pixel units contained in pixel units of the display panel. For example, in a case that each pixel unit includes a red sub-pixel unit, a green sub-pixel unit, and a blue sub-pixel unit, the first image at least includes three colors, i.e., red, green, and blue images.

Here, the second detection voltage in the third detection data set is a detection voltage measured by a sensing circuit, without filtering and other processing. The compensated data voltage is calculated directly using the third detection data set, and the first image data is displayed based on the compensated data voltage, such that each abnormally-displayed sub-pixel unit of the display panel may be exposed, so as to determine the position information of the abnormal sub-pixels according to display-related parameters.

In step 503, a display-related parameter set is acquired when the display panel displays the first image.

The display-related parameter set includes display-related parameters of the plurality of sub-pixel units.

Optionally, the display-related parameters include at least one of the following parameters: the luminance of each sub-pixel unit, a threshold voltage of a drive TFT in each sub-pixel unit, and the mobility of the drive TFT in each sub-pixel unit.

Figure 6:
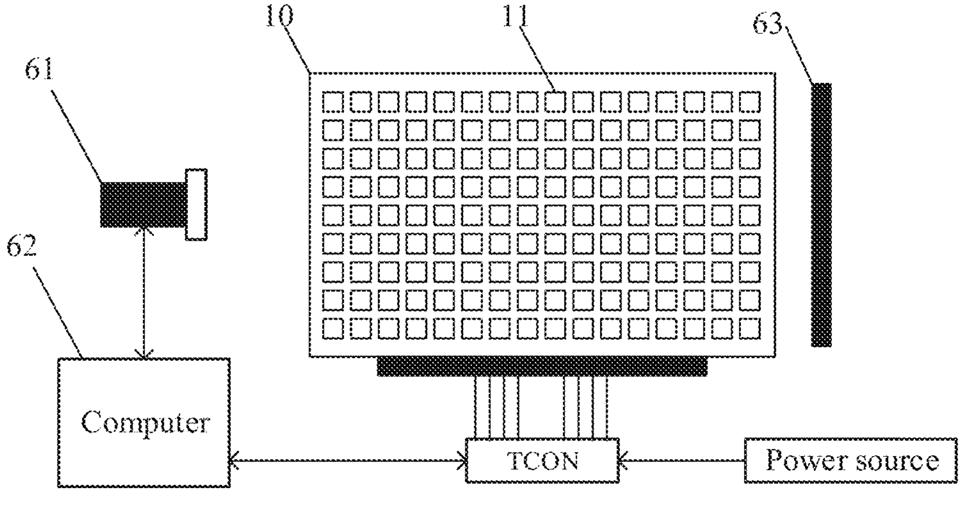
FIG. 6 is a schematic structural diagram of a testing system for a display panel provided by an embodiment of the present disclosure.

In a case that the display-related parameters include the luminance of the sub-pixel unit, the step 501 to step 503 may be performed by using a testing system shown in FIG. 6. As shown in FIG. 6, the testing system includes a camera 61 (e.g., charge coupled device (CCD)) and a computer 62, the computer 62 is configured to send image data of the first image to the TCON, and the TCON controls the display panel 10 to emit light according to the received image data. The camera 61 is configured to capture an image displayed by the display panel 10. The computer 62 is configured to determine the luminance of each sub-pixel unit 11 according to the image captured by the camera 61. Optionally, this testing system further includes a light source 63, and the light source 63 is disposed on a side of the display panel 10 and configured to illuminate the display panel 10 from one side of the display panel 10, for example, emit light from the right side to the left side of the display panel 10 in FIG. 6. Under the illumination of the light source 63, whether there are debris on the surface of the display panel 10 is observed conveniently, to avoid the impact of the debris on test results.

In step 504, the position information of the abnormal sub-pixel units is determined according to the display-related parameter set.

It should be noted that, in order to improve the accuracy of the test results, in this embodiment of the present disclosure, in addition to acquiring the display-related parameter set when the display panel displays the first image, it is also possible to compensate the respective sub-pixel units according to the third detection data set when the display panel displays a second image, to acquire the display-related parameter set when the display panel displays the second image, and to determine the position information of the abnormal sub-pixel units according to the display-related parameter set. The first and second images may be images of different grayscales corresponding to the same color.

In some embodiments, the position information of the abnormal sub-pixel units is determined according to the display-related parameter set in the following way:

- determining the position information of the sub-pixel unit corresponding to the display-related parameter that reaches a first threshold as the position information of the abnormal sub-pixel unit.

In a case that the display-related parameter is luminance information, the first threshold corresponds to the grayscale of the first image. Different grayscales correspond to different first thresholds. The larger the grayscale, the larger the corresponding first threshold.

In a case that the display-related parameter is the threshold voltage of the drive TFT or the mobility of the drive TFT, the first threshold is a fixed value, or the first threshold is X times the average value of display-related parameters of all sub-pixel units adjacent to the sub-pixel unit, where X is a set value and greater than 1. For example, X is 1.5, 2, or the like.

This way of determining the position information of the abnormal sub-pixel units is simple, easy to implement, and efficient.

In other embodiments, the position information of the abnormal sub-pixel units is determined according to the display-related parameter set in the following two steps.

In the first step, frequency domain conversion is performed on the display-related parameters of the respective sub-pixel units to obtain frequency domain parameters.

The frequency domain conversion methods include Fourier transform, wavelet transform, etc.

In the second step, the position information of the sub-pixel unit corresponding to the display-related parameter that reaches a second threshold is determined as the position information of the abnormal sub-pixel unit. In an exemplary embodiment, the second threshold may be Y times the average value of frequency domain parameters of all sub-pixel units adjacent to the sub-pixel unit, where Y is a set value and greater than 1. For example, Y is 1.5, 2, or the like.

By converting the display-related parameters to a frequency domain for analysis, the positions of the abnormal sub-pixel units may be acquired more comprehensively.

In yet another possible embodiment, the position information of the abnormal sub-pixel units is determined according to the display-related parameter set in the following manner.

In the first step, position information of the sub-pixel unit corresponding to the display-related parameter that reaches a first threshold is determined as the position information of the abnormal sub-pixel unit.

In the second step, frequency domain conversion is performed on the display-related parameters of the respective sub-pixel units to acquire frequency domain parameters.

In the third step, the position information of the sub-pixel unit corresponding to the frequency domain parameter that reaches the second threshold is determined as the position information of the abnormal sub-pixel unit.

In the fourth step, the position information of the abnormal sub-pixel units is determined according to the first position information and the second position information.

Optionally, a union set of the first position information and the second position information is used as the position information of the abnormal sub-pixel units.

The display-related parameters are analyzed from the frequency domain and time domain, such that the determined position information can be more comprehensive and accurate.

After the position information is determined, the position information is stored in the memory of the displaying apparatus. By acquiring the position information of the abnormal sub-pixel units in advance before leaving the factory and storing it in the memory of the displaying apparatus, the pre-stored position information of the abnormal sub-pixel units may be acquired directly from the memory of the displaying apparatus after leaving the factory.

Figure 7:
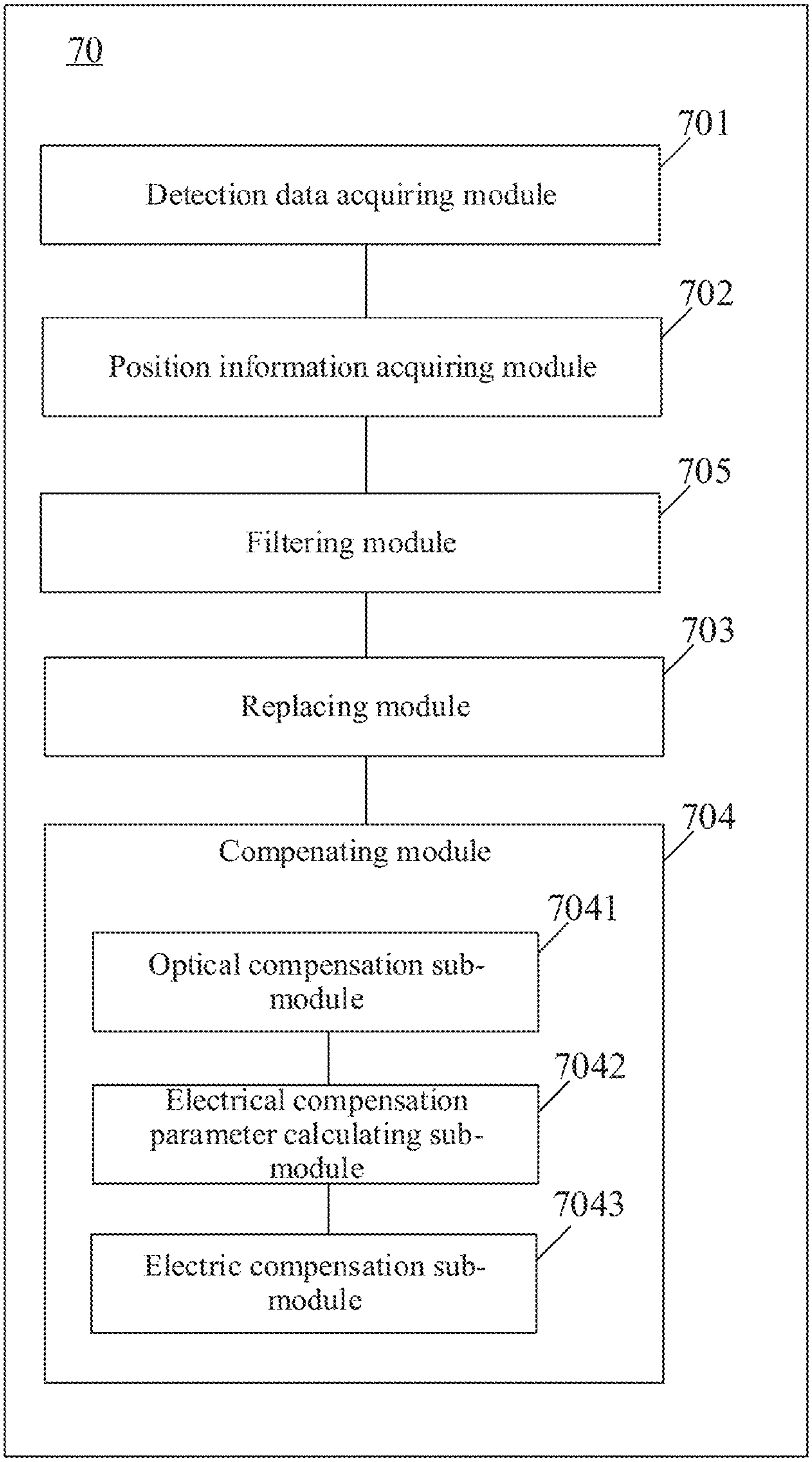
FIG. 7 is a schematic structural diagram of an apparatus for compensating a display panel provided by an embodiment of the present disclosure.

FIG. 7 is a schematic structural diagram of an apparatus for compensating a display panel provided by an embodiment of the present disclosure. As shown in FIG. 7, the apparatus 70 includes a detection data acquiring module 701, a position information acquiring module 702, a replacing module 703 and a compensating module 704.

The detection data acquiring module 701 is configured to acquire a first detection data set, and the first detection data set includes first detection data of a plurality of sub-pixel units. The position information acquiring module 702 is configured to acquire pre-stored position information of abnormal sub-pixel units, and the position information is used to indicate positions of sub-pixel units whose display are abnormal. The replacing module 703 is configured to replace the first detection data of the first abnormal sub-pixel unit in the first detection data set based on the first detection data of a target sub-pixel unit, so as to obtain a second detection data set, the target sub-pixel unit is at least one normal sub-pixel unit adjacent to the first abnormal sub-pixel unit in the plurality of sub-pixel units, and the first abnormal sub-pixel unit is any of the sub-pixel units indicated by the position information. The compensating module 704 is configured to compensate the respective sub-pixel units according to the second detection data set.

Optionally, the replacing module 703 is configured to replace the first detection data of the first abnormal sub-pixel unit in any of the following ways:

the first detection data of the first abnormal sub-pixel unit is replaced by the first detection data of one normal sub-pixel unit which is disposed in the same row as the first abnormal sub-pixel unit and adjacent to the first abnormal sub-pixel unit; and the first detection data of the first abnormal sub-pixel unit is replaced by an average value of the first detection data of at least two normal sub-pixel units which are disposed in the same row as the first abnormal sub-pixel unit and adjacent to the first abnormal sub-pixel unit.

Optionally, the compensating module 704 includes an electrical compensation parameter calculating sub-module 7042 and an electrical compensation sub-module 7043. The electrical compensation parameter calculating sub-module 7042 is configured to calculate an electrical compensation parameter set according to the second detection data set, and the electrical compensation parameter set includes electrical compensation parameters of the plurality of sub-pixel units. The electrical compensation sub-module 7043 is configured to perform electrical compensation on the data voltages of pixel drive circuits of the corresponding sub-pixel units according to the compensation parameter set.

Optionally, the compensating module 704 further includes an optical compensation sub-module 7041. The optical compensation sub-module 7041 is configured to perform optical compensation on the data voltages of pixel drive circuits of the corresponding sub-pixel units according to the pre-stored optical compensation parameters.

Optionally, the apparatus 70 further includes a filtering module 705, and the filtering module 705 is configured to filter the first detection data in the first detection data set.

It should be noted: when the apparatus for compensating the display panel provided by the above embodiment performs a compensation of the display panel, only the partitioning of the above functional modules is used as an example. In actual applications, the foregoing functions can be allocated to be completed by different functional modules as required. That is, the internal structure of the apparatus is partitioned into different functional modules to complete all or part of the functions described above. In addition, the apparatus for compensating the display panel provided in the foregoing embodiments and the method embodiments for compensating the display panel fall within the same conception. For details of a specific implementation process, refer to the method embodiments. Details are not described herein again.

The division of modules in the embodiments of the present disclosure is schematic and is only a logical function division, and other division ways may also be used in the actual implementation. In addition, all functional modules in the embodiments of the present disclosure nay be integrated into one processor. Or, each module exists physically independently. Or, two or more modules may be integrated into one module. The above integrated modules can be implemented in the form of hardware or software function modules.

The integrated modules, if implemented in the form of a software functional unit and sold or used as a separate product, may be stored in a computer-readable storage medium. According to this understanding, the technical solutions of the present disclosure in essence (or parts contributed to the prior art) or all or part of the technical solutions may be embodied in the form of a software product. This computer software product is stored in a storage medium and includes a plurality of instructions, such that a terminal device (which may be a personal computer, a mobile phone, a communication device, or the like) or a processor performs all or part of the steps of the methods in respective embodiments of the present disclosure. The aforementioned storage media include: a U disk, a portable hard disk, a read-only memory (ROM), a random access memory (RAM), a magnetic disk or an optical disc or other media that can store program codes therein.

An embodiment of the present disclosure provides an apparatus for compensating a display panel. The apparatus includes one or more processors, and one or more memories, the one or more memories are configured to store at least one program code therein, the at least one program code is loaded and performed by the one or more processors to implement any of the above methods for compensating the display panel.

Figure 8:
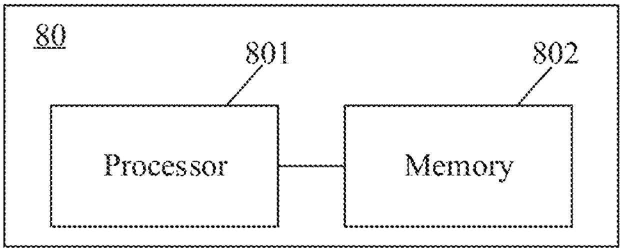
FIG. 8 is a schematic structural diagram of another apparatus for compensating a display panel provided by an embodiment of the present disclosure.

FIG. 8 is a schematic structural diagram of another apparatus for compensating a display panel provided by an embodiment of the present disclosure. As shown in FIG. 8, the apparatus 80 includes a processor 801 and a memory 802.

The processor 801 may include one or more processing cores, such as a 4-core processor and an 8-core processor. The processor 801 may be implemented by at least one hardware of digital signal processing (DSP), a field-programmable gate array (FPGA), and a programmable logic array (PLA). The processor 801 may also include a main processor and a coprocessor. The main processor is a processor configured to process the data in an awake state, and is also called a central processing unit (CPU). The coprocessor is a low-power-consumption processor configured to process the data in a standby state.

The memory 802 may include one or more computer-readable storage mediums, which can be non-transitory. The memory 802 may also include a high-speed random access memory, as well as a non-volatile memory, such as one or more disk storage devices and flash storage devices. In some embodiments, a non-transitory computer-readable storage medium in the memory 802 is configured to store at least one instruction, which is executed by the processor 801 to implement the method for compensating the display panel provided by the method embodiment of the present disclosure.

An embodiment of the present disclosure provides a computer-readable storage medium, the computer-readable storage medium is used to store at least one program code therein, the at least one program code is loaded and executed by a processor to implement any of the aforementioned methods for compensating the display panel.

An embodiment of the present disclosure further provides a computer program product or a computer program, which includes a computer instruction configured to implement any of the aforementioned methods for compensating the display panel.

Figure 9:
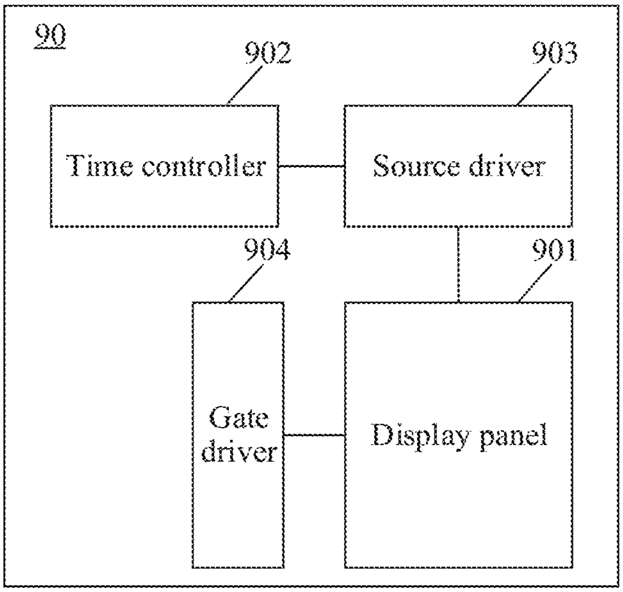
FIG. 9 is a schematic structural diagram of a displaying apparatus provided by an embodiment of the present disclosure.

An embodiment of the present disclosure further provides a displaying apparatus. FIG. 9 is a schematic structural diagram of a displaying apparatus according to an embodiment of the present disclosure. As shown in FIG. 9, the displaying apparatus 90 includes a display panel 901, a time controller 902 and a source driver 903, where the source driver 903 is electrically connected to pixel drive circuits of respective sub-pixel units in the time controller 902 and the display panel 901, respectively.

The time controller 902 is configured to convert image information of an image to be displayed into data voltages of the respective sub-pixel units. The time controller 902 is configured to implement any of the aforementioned methods for compensating the display panel, to compensate the data voltages of the respective sub-pixel units, and to output the compensated data voltages to the source driver 903. The source driver 903 is configured to control the respective sub-pixel units of the display panel 901 to emit light according to the compensated data voltages.

The displaying apparatus 90 further includes a gate driver 904, where the gate driver 904 is electrically connected to pixel drive circuits of respective sub-pixel units in the time controller 902 and the display panel 901, respectively. The time controller 902 is further configured to output control signals, etc. to the gate driver 904. The gate driver 904 is configured to output scan signals to the respective sub-pixel units according to the received control signals.

The time controller 902 is further configured to acquire sensing data of the respective sub-pixel units via the gate driver 904 and the source driver 903.

Optionally, the displaying apparatus further includes a power supply circuit (not shown), the power supply circuit is configured to supply power to the display panel and the time controller.

In an exemplary embodiment, the displaying apparatus provided by this embodiment of the present disclosure may be any product or component having a display function, such as a mobile phone, a tablet computer, a television, a display, a laptop computer, a digital photo frame or a navigator.

Described above are merely optional embodiments of the present disclosure, but are not intended to limit the present disclosure. Any modifications, equivalent replacements, improvements and the like made within the spirit and principles of the present disclosure should be included within the scope of protection of the present disclosure.

What is claimed is:

1. A method for compensating a display panel, the display panel comprising a plurality of pixel units arranged in an array, each pixel unit comprising a plurality of sub-pixel units, the method comprising:

acquiring a first detection data set, wherein the first detection data set comprises first detection data of the plurality of sub-pixel units;

acquiring pre-stored position information of abnormal sub-pixel units, wherein the position information is used to indicate positions of sub-pixel units whose display are abnormal;

replacing first detection data of a first abnormal sub-pixel unit in the first detection data set based on first detection data of a target sub-pixel unit, so as to acquire a second detection data set, wherein the target sub-pixel unit is at least one normal sub-pixel unit adjacent to the first abnormal sub-pixel unit among the plurality of sub-pixel units, and the first abnormal sub-pixel unit is any of the sub-pixel units indicated by the position information; and compensating data voltages of the plurality of sub-pixel units according to the second detection data set, wherein acquiring the pre-stored position information of the abnormal sub-pixel units comprises:

acquiring a third detection data set, wherein the third detection data set comprises second detection voltages of the plurality of sub-pixel units;

compensating the respective sub-pixel units according to the third detection data set, when the display panel displays a first image;

acquiring a display-related parameter set when the display panel displays the first image, wherein the display-related parameter set comprises display-related parameters of the plurality of sub-pixel units;

determining position information of the abnormal sub-pixel units according to the display-related parameter set; and storing the position information in a storage unit of a displaying apparatus.

2. The method according to claim 1, wherein the replacing the first detection data of the first abnormal sub-pixel unit in the first detection data set based on the first detection data of the target sub-pixel unit comprises:

replacing the first detection data of the first abnormal sub-pixel unit with first detection data of one normal sub-pixel unit which is disposed in the same row as the first abnormal sub-pixel unit and adjacent to the first abnormal sub-pixel unit; or replacing the first detection data of the first abnormal sub-pixel unit with an average value of first detection data of at least two normal sub-pixel units which are disposed in the same row as the first abnormal sub-pixel unit and adjacent to the first abnormal sub-pixel unit.

3. The method according to claim 1, further comprising:

prior to replacing the first detection data of the first abnormal sub-pixel unit in the first detection data set based on the first detection data of the target sub-pixel unit, filtering the first detection data in the first detection data set.

4. The method according to claim 1, wherein the display-related parameters comprise at least one of the following parameters: luminance of each sub-pixel unit, a threshold voltage of a drive transistor in each sub-pixel unit, and mobility of the drive transistor in each sub-pixel unit.

5. The method according to claim 1, wherein the determining the position information of the abnormal sub-pixel units according to the display-related parameter set comprises:

determining position information of a sub-pixel unit corresponding to the display-related parameter that reaches a first threshold as the position information of the abnormal sub-pixel unit.

6. The method according to claim 1, wherein the determining the position information of the abnormal sub-pixel units according to the display-related parameter set comprises:

performing frequency domain conversion on the display-related parameters to obtain frequency domain parameters; and determining position information of a sub-pixel unit corresponding to the display-related parameter that reaches a second threshold as the position information of the abnormal sub-pixel unit.

7. The method according to claim 1, wherein the compensating the data voltages of the plurality of sub-pixel units according to the second detection data set comprises:

calculating an electrical compensation parameter set according to the second detection data set, wherein the electrical compensation parameter set comprises electrical compensation parameters of the plurality of sub-pixel units; and performing electrical compensation on data voltages of pixel drive circuits of corresponding sub-pixel units according to the electrical compensation parameter set.

8. The method according to claim 7, wherein the compensating the data voltages of the plurality of sub-pixel units according to the second detection data set comprises:

prior to compensating the data voltages of the pixel drive circuits of the corresponding sub-pixel units by using the electrical compensation parameter set, performing optical compensation on the data voltages of the pixel drive circuits of the corresponding sub-pixel units according to pre-stored optical compensation parameters.

9. An apparatus for compensating a display panel, the display panel comprising a plurality of pixel units arranged in an array, each pixel unit comprising a plurality of sub-pixel units, the apparatus comprising:

a detection data acquiring module, wherein the detection data acquiring module is configured to acquire a first detection data set, and the first detection data set comprises first detection data of a plurality of sub-pixel units;

a position information acquiring module, wherein the position information acquiring module is configured to acquire pre-stored position information of abnormal sub-pixel units, and the position information is used to indicate positions of sub-pixel units whose display are abnormal;

a replacing module, wherein the replacing module is configured to replace first detection data of a first abnormal sub-pixel unit in the first detection data set based on first detection data of a target sub-pixel unit, so as to obtain a second detection data set, the target sub-pixel unit is at least one normal sub-pixel unit adjacent to the first abnormal sub-pixel unit among the plurality of sub-pixel units, and the first abnormal sub-pixel unit is any of the sub-pixel units indicated by the position information; and a compensating module, wherein the compensating module is configured to compensate data voltages of the plurality of sub-pixel units according to the second detection data set, wherein the position information acquiring module is further configured to:

acquire a third detection data set, wherein the third detection data set comprises second detection voltages of the plurality of sub-pixel units;

compensate the respective sub-pixel units according to the third detection data set, when the display panel displays a first image;

acquire a display-related parameter set when the display panel displays the first image, wherein the display-related parameter set comprises display-related parameters of the plurality of sub-pixel units;

determine position information of the abnormal sub-pixel units according to the display-related parameter set; and store the position information in a storage unit of a displaying apparatus.

10. The apparatus according to claim 9, wherein the replacing module is configured to replace the first detection data of the first abnormal sub-pixel unit in any of the following ways:

replace the first detection data of the first abnormal sub-pixel unit with the first detection data of one normal sub-pixel unit which is disposed in the same row as the first abnormal sub-pixel unit and adjacent to the first abnormal sub-pixel unit; and replace the first detection data of the first abnormal sub-pixel unit with an average value of the first detection data of at least two normal sub-pixel units which are disposed in the same row as the first abnormal sub-pixel unit and adjacent to the first abnormal sub-pixel unit.

11. The apparatus according to claim 9, further comprising a filtering module, wherein the filtering module is configured to filter the first detection data in the first detection data set.

12. A displaying apparatus, comprising a display panel, a time controller and a source controller, the display panel comprising a plurality of pixel units arranged in an array, each pixel unit comprising a plurality of sub-pixel units, wherein the time controller is configured to: acquire a first detection data set, the first detection data set comprising first detection data of the plurality of sub-pixel units; acquire pre-stored position information of abnormal sub-pixel units, the position information being used to indicate positions of sub-pixel units whose display are abnormal; replace first detection data of a first abnormal sub-pixel unit in the first detection data set based on first detection data of a target sub-pixel unit, so as to obtain a second detection data set, the target sub-pixel unit being at least one normal sub-pixel unit adjacent to the first abnormal sub-pixel unit among the plurality of sub-pixel units, the first abnormal sub-pixel unit being any of the sub-pixel units indicated by the position information; and compensate data voltages of the plurality of sub-pixel units according to the second detection data set; and the source controller is configured to control the corresponding sub-pixel units to emit light according to compensated data voltages, wherein the time controller is further configured to:

acquire a third detection data set, wherein the third detection data set comprises second detection voltages of the plurality of sub-pixel units;

compensate the respective sub-pixel units according to the third detection data set, when the display panel displays a first image;

acquire a display-related parameter set when the display panel displays the first image, wherein the display-related parameter set comprises display-related parameters of the plurality of sub-pixel units;

determine position information of the abnormal sub-pixel units according to the display-related parameter set; and store the position information in a storage unit of a displaying apparatus.

13. The apparatus according to claim 12, wherein the time controller is configured to replace the first detection data of the first abnormal sub-pixel unit in any of the following ways:

replacing the first detection data of the first abnormal sub-pixel unit with the first detection data of one normal sub-pixel unit which is disposed in the same row as the first abnormal sub-pixel unit and adjacent to the first abnormal sub-pixel unit; and replacing the first detection data of the first abnormal sub-pixel unit with an average value of the first detection data of at least two normal sub-pixel units which are disposed in the same row as the first abnormal sub-pixel unit and adjacent to the first abnormal sub-pixel unit.

14. The apparatus according to claim 12, wherein the time controller is configured to filter the first detection data in the first detection data set.

15. The apparatus according to claim 12, wherein the time controller is configured to:

calculate an electrical compensation parameter set according to the second detection data set, wherein the electrical compensation parameter set comprises electrical compensation parameters of the plurality of sub-pixel units; and perform electrical compensation on data voltages of pixel drive circuits of corresponding sub-pixel units according to the electrical compensation parameter set.

16. The apparatus according to claim 15, wherein the time controller is further configured to perform optical compensation on the data voltages of pixel drive circuits of the corresponding sub-pixel units according to the pre-stored optical compensation parameters.

17. A computer device, comprising a processor and a memory, wherein the memory is configured to store at least one computer program therein, and the at least one computer program is loaded and executed by the processor to implement the method according to claim 1.

18. A non-transitory computer-readable storage medium, wherein the non-transitory computer-readable storage medium stores at least one computer program therein, and the computer program is loaded and executed by a processor to implement the method according to claim 1.

* * * * *